(12) United States Patent
Andrzejewski et al.

(10) Patent No.: US 8,699,838 B2
(45) Date of Patent: Apr. 15, 2014

(54) FIBER OPTIC FURCATION MODULE

(75) Inventors: Tomasz Andrzejewski, Zgierz (PL); Grzegorz Tosik, Buczek (PL)

(73) Assignee: CCS Technology, Inc., Wilmington, DE (US)

( * ) Notice: Subject to any disclaimer, the term of this patent is extended or adjusted under 35 U.S.C. 154(b) by 147 days.

(21) Appl. No.: 13/292,130

(22) Filed: Nov. 9, 2011

(65) Prior Publication Data

US 2012/0057836 A1 Mar. 8, 2012

Related U.S. Application Data

(63) Continuation of application No. PCT/US2010/034298, filed on May 11, 2010.

(30) Foreign Application Priority Data

May 14, 2009 (EP) ..................................... 09006500

(51) Int. Cl.
G02B 6/30 (2006.01)
(52) U.S. Cl.
USPC .......................................................... 385/49
(58) Field of Classification Search
None
See application file for complete search history.

(56) References Cited

U.S. PATENT DOCUMENTS

| 620,013 | A | 2/1899 | Barnes |
|---|---|---|---|
| 2,614,685 | A | 10/1952 | Miller |
| 3,175,873 | A | 3/1965 | Blomquist et al. |
| 3,212,192 | A | 10/1965 | Bachmann et al. |
| 3,433,886 | A | 3/1969 | Myers |
| 3,568,263 | A | 3/1971 | Meehan |
| 3,646,244 | A | 2/1972 | Cole |
| 3,880,396 | A | 4/1975 | Freiberger et al. |
| 3,906,592 | A | 9/1975 | Sakasegawa et al. |
| 3,991,960 | A | 11/1976 | Tanaka |
| 4,047,797 | A | 9/1977 | Arnold et al. |
| 4,059,872 | A | 11/1977 | Delesandri |

(Continued)

FOREIGN PATENT DOCUMENTS

| CA | 2029592 A1 | 5/1992 |
|---|---|---|
| CA | 2186314 A1 | 4/1997 |

(Continued)

OTHER PUBLICATIONS

Annex to Form PCT/ISA/2006, Communication Relating to the Results of the Partial International Search, for PCT/US2009/004549 mailed Feb. 10, 2010, 2 pages.

(Continued)

*Primary Examiner* — Sung Pak

(57) ABSTRACT

The invention relates to a fiber optic furcation module, comprising: at least one planar wave guide card; a first adapter assigned to the or each planar wave guide card, the or each first adapter comprising a plurality of adapter ports for optical fibers terminated in an optical fiber ribbon connector; a plurality of second adapters assigned to the or each planar wave guide card, each of said second adapters comprising one adapter port or two adapter ports, the one or two adapter ports being operative to receive respective single optical fiber connectors terminated with single optical fibers; a plurality of fiber optic transmission channels provided by the or each planar wave guide card, the fiber optic transmission channels providing optical traces being operative to transmit and/or receive optical wavelength signals and connecting each adapter port of a first adapter with an adapter port of one of said second adapters.

20 Claims, 4 Drawing Sheets

(56) References Cited

U.S. PATENT DOCUMENTS

| | | |
|---|---|---|
| 4,119,285 A | 10/1978 | Bisping et al. |
| 4,239,316 A | 12/1980 | Spaulding |
| 4,285,486 A | 8/1981 | Von Osten et al. |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,787,706 A | 11/1988 | Cannon, Jr. et al. |
| 4,792,203 A | 12/1988 | Nelson et al. |
| 4,798,432 A | 1/1989 | Becker et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,731 A | 12/1993 | White |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A * | 8/1995 | Yui et al. .................. 385/49 |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,535,970 A | 7/1996 | Gobbi |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |

(56) References Cited

U.S. PATENT DOCUMENTS

| | | |
|---|---|---|
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,758,003 A | 5/1998 | Wheeler et al. |
| 5,758,004 A | 5/1998 | Alarcon et al. |
| 5,761,026 A | 6/1998 | Robinson et al. |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,170,784 B1 | 1/2001 | MacDonald et al. |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,325,549 B1 | 12/2001 | Shevchuk |
| RE37,489 E | 1/2002 | Anton et al. |
| 6,343,313 B1 | 1/2002 | Salesky et al. |
| 6,347,888 B1 | 2/2002 | Puetz |
| 6,353,696 B1 | 3/2002 | Gordon et al. |
| 6,353,697 B1 | 3/2002 | Daoud |
| 6,359,228 B1 | 3/2002 | Strause et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | De Jong et al. |
| 6,385,374 B2 | 5/2002 | Kropp |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |

(56) References Cited

U.S. PATENT DOCUMENTS

| | | | |
|---|---|---|---|
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 * | 11/2004 | Nashimoto ............... 385/131 |
| 6,818,834 B1 | 11/2004 | Lin |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B1 | 11/2006 | Richtman |

(56) References Cited

U.S. PATENT DOCUMENTS

| | | |
|---|---|---|
| 7,140,903 B2 | 11/2006 | Pulizzi et al. |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,220,065 B2 | 5/2007 | Han et al. |
| 7,221,832 B2 | 5/2007 | Tinucci |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,751,674 B2 | 7/2010 | Hill |
| 7,751,675 B2 | 7/2010 | Holmberg et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,805,044 B2 | 9/2010 | Reagan et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,059,932 B2 | 11/2011 | Hill et al. |
| 8,107,785 B2 | 1/2012 | Berglund et al. |
| 8,206,058 B2 | 6/2012 | Vrondran et al. |
| 8,472,773 B2 | 6/2013 | de Jong |
| 8,537,477 B2 | 9/2013 | Shioda |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0007743 A1 | 1/2003 | Asada |

(56) References Cited

U.S. PATENT DOCUMENTS

| | | |
|---|---|---|
| 2003/0007767 A1 | 1/2003 | Douglas et al. |
| 2003/0021539 A1* | 1/2003 | Kwon et al. .................... 385/50 |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0131628 A1 | 6/2007 | Mimlitch, III et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |

(56) References Cited

U.S. PATENT DOCUMENTS

| | | |
|---|---|---|
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |
| 2010/0247051 A1 | 9/2010 | Kowalczyk et al. |
| 2010/0278499 A1 | 11/2010 | Mures et al. |
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0211799 A1 | 9/2011 | Conner et al. |
| 2011/0217016 A1 | 9/2011 | Mullsteff |
| 2011/0268404 A1 | 11/2011 | Cote et al. |
| 2011/0280537 A1 | 11/2011 | Cowen et al. |
| 2012/0051707 A1 | 3/2012 | Barnes et al. |
| 2012/0057838 A1 | 3/2012 | Hill et al. |
| 2012/0183263 A1 | 7/2012 | Wu |
| 2013/0077927 A1 | 3/2013 | O'Connor |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 20115940 U1 | 1/2002 |
| DE | 10338848 A1 | 3/2005 |
| DE | 202005009932 U1 | 11/2005 |
| EP | 0105597 A2 | 4/1984 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1316829 A2 | 6/2003 |
| EP | 1621907 A1 | 2/2006 |
| EP | 1777563 A1 | 4/2007 |
| FR | 2378378 A1 | 8/1978 |
| GB | 2241591 A | 9/1991 |
| GB | 2277812 A | 11/1994 |
| GB | 2367379 A | 4/2002 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |

(56) References Cited

FOREIGN PATENT DOCUMENTS

| | | | |
|---|---|---|---|
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2008113054 A2 | 9/2008 |
| WO | 2008157248 A1 | 12/2008 |
| WO | 2009120280 A2 | 10/2009 |
| WO | 2010080745 A1 | 7/2010 |

OTHER PUBLICATIONS

Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US20101/023901 mailed Aug. 25, 2011, 8 pages.
Advisory Action for U.S. Appl. No. 12/221,117 mailed Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.

(56) References Cited

OTHER PUBLICATIONS

International Search Report and Written Opinion for PCT/US2011/035684 mailed Jul. 1, 2011, 11 pages.
International Search Report and Written Opinion for PCT/US11/61754 mailed Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 mailed Jan. 2, 2014, 3 pages.
Notice of Allowance for U.S. Appl. No. 12/871,052 mailed Dec. 24, 2013, 9 pages.
Final Office Action for U.S. Appl. No. 12/953,039 mailed Dec. 27, 2013, 10 pages.
Advisory Action for U.S. Appl. No. 12/952,960 mailed Jan. 8, 2014, 3 pages.
Advisory Action for U.S. Appl. No. 12/952,912 mailed Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 mailed Jan. 14, 2014, 9 pages.
Final Office Action for U.S. Appl. No. 12/732,487 mailed Dec. 6, 2013, 24 pages.
Final Office Action for U.S. Appl. No. 12/956,446 mailed Dec. 23, 2013, 12 pages.
Non-final Office Action for U.S. Appl. No. 12/953,536 mailed Dec. 17, 2013, 21 pages.
Non-final Office Action for U.S. Appl. No. 12/819,065 mailed Dec. 3, 2013, 8 pages.
International Search Report and Written Opinion for PCT/US2011/062353 mailed Apr. 10, 2012, 15 pages.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Final Office Action for U.S. Appl. No. 12/394,114 mailed Oct. 25, 2012, 8 pages.
Non-final Office Action for U.S. Appl. No. 12/915,682 mailed Oct. 24, 2012, 8 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/953,134 mailed Sep. 25, 2012, 8 pages.
Non-final Office Action for U.S. Appl. No. 12/953,039 mailed Jan. 11, 2013, 6 pages.
Non-final Office Action for U.S. Appl. No. 12/952,912 mailed Dec. 28, 2012, 9 pages.
Non-final Office Action for U.S. Appl. No. 12/953,118 mailed Jan. 7, 2013, 9 pages.
Non-final Office Action for U.S. Appl. No. 12/953,536 mailed Jan. 2, 2013, 20 pages.
Non-final Office Action for U.S. Appl. No. 12/707,889 mailed Jan. 2, 2013, 7 pages.
European Search Report for patent application 10790017.7 mailed Nov. 8, 2012, 7 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Non-final Office Action for U.S. Appl. No. 12/946,139 mailed Jul. 26, 2012, 12 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Non-final Office Action for U.S. Appl. No. 12/953,134 mailed Mar. 21, 2013, 9 pages.
Final Office Action for U.S. Appl. No. 12/641,617 mailed May 10, 2013, 21 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-final Office Action for U.S. Appl. No. 12/956,475 mailed Oct. 4, 2012, 7 pages.
Non-final Office Action for U.S. Appl. No. 13/302,067 mailed Jun. 7, 2013, 13 pages.
Final Office Action for U.S. Appl. No. 12/771,473 mailed Jul. 19, 2013, 7 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/953,134 mailed Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Unknown, Author, "QuickNet SFQ Series MTP Fiber Optic Cassettes," Panduit Specification Sheet, Jan. 2009, 2 pages.

(56) References Cited

OTHER PUBLICATIONS

Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Non-final Office Action for U.S. Appl. No. 13/901,074 mailed Oct. 9, 2013, 6 pages.
Advisory Action for U.S. Appl. No. 12/953,134 mailed Nov. 4, 2013, 3 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
International Search Report and Written Opinion for PCT/US2011/035683 mailed Sep. 8, 2011, 15 pages.
International Search Report and Written Opinion for PCT/US2010/039218 mailed Oct. 27, 2010, 13 pages.
First Office Action for Chinese patent application 201080032453.2 issued Mar. 26, 2013, 6 pages.
Chinese Search Report for Chinese patent application 201080032453.2 mailed May 15, 2013, 2 pages.
First Office Action for Chinese patent application 201080031621.6 mailed Sep. 26, 2013, 9 pages.
Chinese Search Report for Chinese patent application 201080031621.6 mailed Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
Non-final Office Action for U.S. Appl. No. 13/603,894 mailed Oct. 3, 2013, 9 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
International Search Report for PCT/US2009/066779 mailed Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high, product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.

(56) References Cited

OTHER PUBLICATIONS

Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.

* cited by examiner

FIBER OPTIC FURCATION MODULE

PRIORITY APPLICATION

This application is a continuation of International Application No. PCT/US10/34298 filed May 11, 2010, which claims the benefit of priority to European Application No. 09006500.4, filed May 14, 2009, both applications being incorporated herein by reference.

TECHNICAL FIELD

The invention relates to a fiber optic furcation module.

BACKGROUND

Corning Cable Systems Plug&Play™ Universal System brand LANscape® Pretium® is a preterminated optical fiber cabling system particularly used in data center applications. Such a system comprises various components, including so-called CCH (Closet Connector Housing) modules. A plurality of such CCH modules can be positioned in housing, whereby a plurality of housings can be mounted to a rack. The LANscape® Pretium® system belongs in principle to the prior art.

A CCH module of the LANscape® Pretium® system is used to provide a furcation function, namely to break out a 12 fiber ribbon connector being preferably a MTP connector into simplex or duplex style single fiber connectors. Such a CCH module comprises one or two first adapters to which a ribbon fiber connector is connectable. Each first adapter comprises a plurality of adapter ports for optical fibers terminated in a ribbon fiber connector. Such a CCH module comprises further a plurality of second adapters to which single fiber connectors are connectable. Each second adapter comprises one adapter port or two adapter ports for optical fibers terminated in single fiber connectors. A factory-installed and tested optical fiber assembly positioned inside such a CCH module connects each adapter port of the or each first adapter to an adapter port of the second adapters thereby providing the furcation function or break out function.

The CCH modules known from the prior art have a depth of around 90 mm. For the use of such modules in so-called Next Generation Data Centers ("NGDCs") the depth of the modules needs to be reduced. NGDCs denote data centers, which will be smaller, better integrated, of reduced footprint and with improved ventilation. These factors are needed in order to decrease the total cost of ownership in collocation rooms for the operators, facilitate the installers in their work and finally decrease the power consumption of computer room air conditioners. In view of the above described tendency, the depth of CCH modules known from the prior art has become too big.

Actions that could be taken with the optical fibers of the optical fiber assembly positioned inside such a CCH module would allow to reduce the depth to around 40-50 mm. However, a much smaller depth for such a fiber optic furcation module is wanted for the use in NGDCs.

SUMMARY

Against this background, the present invention is based on the object of providing a novel fiber optic furcation module having a reduced depth. This problem is solved by a fiber optic furcation module according to claim 1.

The fiber optic furcation module according to the invention comprises at least one planar wave guide card; a first adapter assigned to the or each planar wave guide card, the or each first adapter comprising a plurality of adapter ports for optical fibers terminated in an optical fiber ribbon connector; a plurality of second adapters assigned to the or each planar wave guide card, each of said second adapters comprising one adapter port or two adapter ports, the one or two adapter ports being operative to receive respective single optical fiber connectors terminated with single optical fibers; a plurality of fiber optic transmission channels provided by the or each planar wave guide card, the fiber optic transmission channels providing optical traces being operative to transmit and/or receive optical wavelength signals and connecting each adapter port of a first adapter with an adapter port of one of said second adapters.

The basic idea of the invention is to replace an optical fiber assembly positioned inside a furcation module by a planar wave guide card.

The planar waveguide card leverages the quickest possible route from the or each first adapter to the second adapters. The permissible bend diameters of the optical fibers of an optical fiber assembly are no longer critical, since with a planar waveguide card small widths of optic transmission channels within the planar waveguide card and tight bend diameters at the same time can be provided. Moreover, the planar waveguide card reduces the adapter size, which no longer protrudes into the module. All that leads to a fiber optic furcation module having a very compact depth, which never before has been achieved. The invention allows reduction of the depth of a fiber optic furcation module to 5-10 mm.

According to a preferred embodiment of the invention each adapter port of the or each first adapter and each second adapter comprises a mode conditioning element and a waveguide funnel.

The mode conditioning element provides the conversion of the size of the light mode to be transmitted within a fiber optic transmission channel of the planar wave guide card.

The waveguide funnel of each adapter port provides a smooth transition between the fiber optic transmission channel of the planar wave guide card and a fiber core of an optical fiber terminated in a fiber optic connector being connectable to the respective adapter port.

BRIEF DESCRIPTION OF THE DRAWINGS

Preferred developments of the invention are given in the dependent claims and the description below. Exemplary embodiments will be explained in more detail with reference to the drawing, in which:

DETAILED DESCRIPTION

Figures 1, 2:
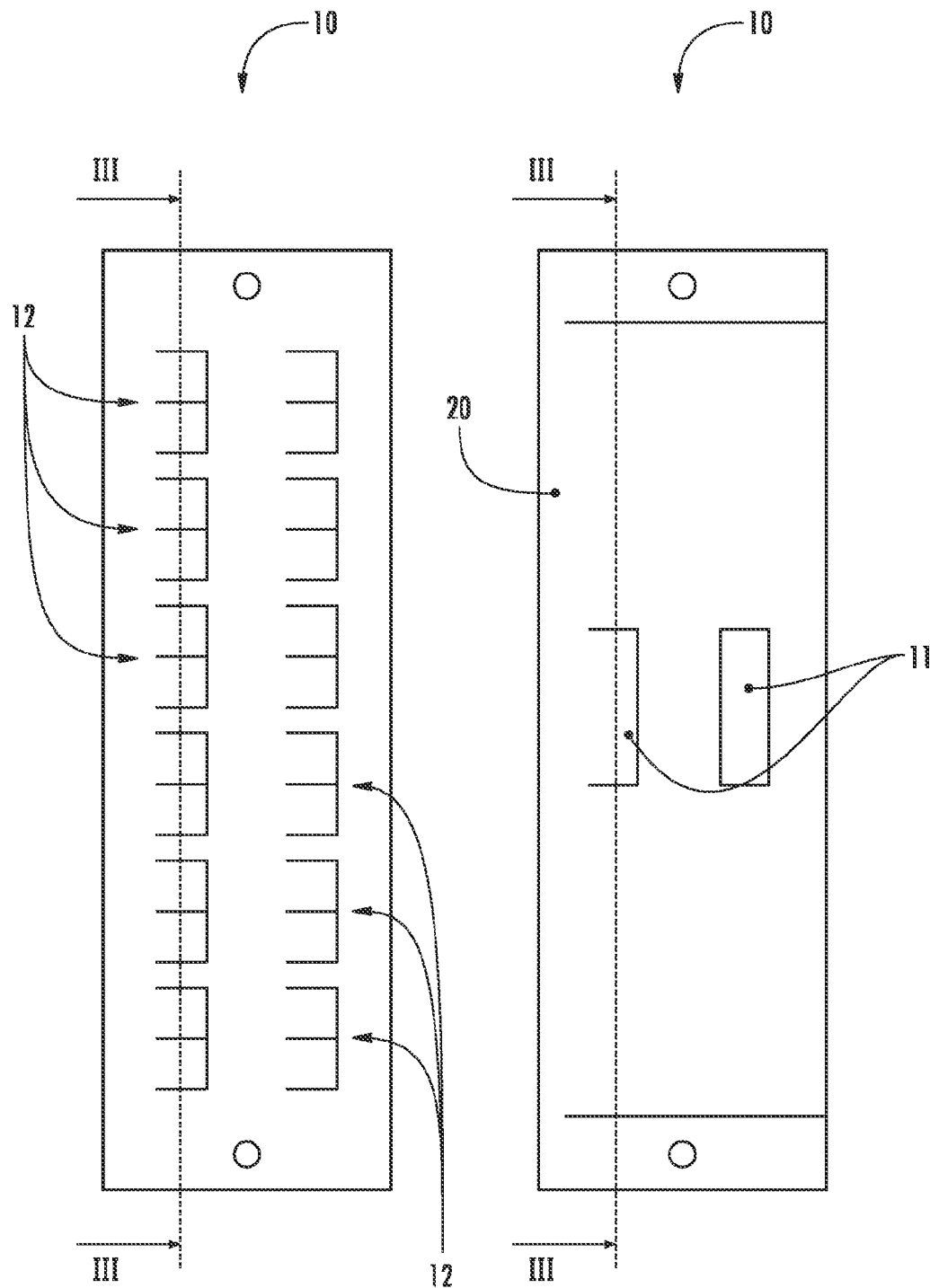
FIG. 1 shows a front view of a fiber optic furcation module according to the present invention.
FIG. 2 shows a back view of a fiber optic furcation module according to the present invention.
Figure 3:
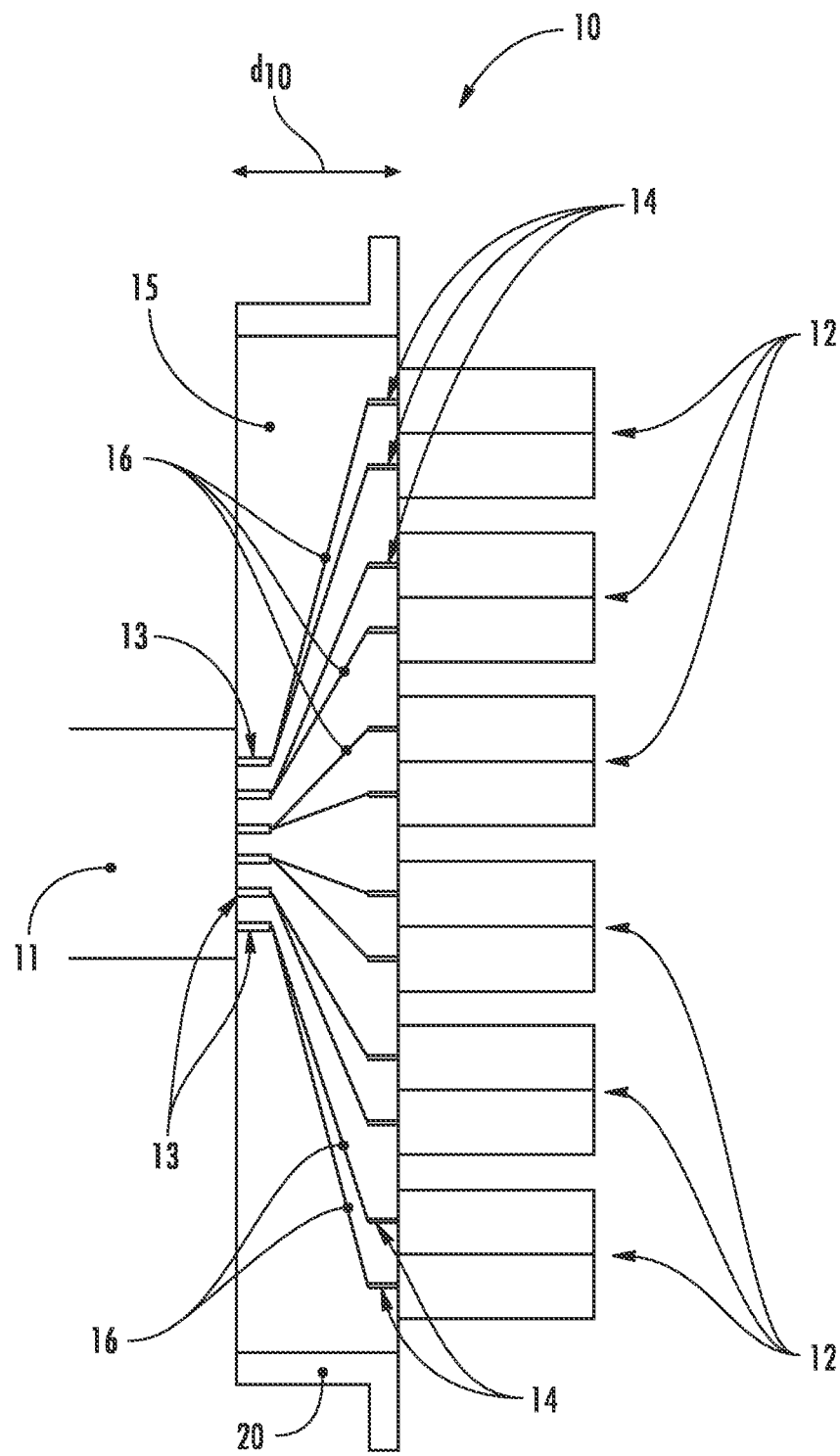
FIG. 3 shows a schematic cross-sectional view though the fiber optic furcation module according to the present invention along the direction III-III in FIGS. 1 and 2.

FIG. 1 shows a front view and FIG. 2 shows a back view of a preferred embodiment of fiber optic furcation module 10 according to present invention, whereby FIG. 3 shows a cross-sectional view though said fiber optic furcation module 10.

The fiber optic furcation module 10 according to FIGS. 1 to 3 comprises two first adapters 11 positioned at the back side of the fiber optic furcation module 10 and a plurality of second adapters 12 positioned at the front side of the fiber optic furcation module 10. Each first adapter 11 comprises a plurality of adapter ports 13 for optical fibers terminated in a ribbon fiber connector. Each second adapter 12 comprises two adapter ports 14 for optical fibers terminated in single fiber connectors.

In the preferred embodiment shown in FIGS. 1 to 3, the two first adapters 11 are designed as MPO adapters, especially as MTP adapters. Each of the two MPO adapters 11 comprises twelve adapter ports 13 for twelve optical fibers terminated in a ribbon fiber connector.

In the preferred embodiment shown in FIGS. 1 to 3, the second adapters 12 are designed as duplex adapters each having two adapter ports 14 for two optical fibers each terminated in a single fiber connector.

Each of the twelve adapter ports 13 of an MPO adapter 11 is optically connected to an adapter port 14 of one duplex adapters 12 being positioned in a row of six duplex adapters 12.

The fiber optic furcation module 10 according to FIGS. 1 to 3 further comprises two planar wave guide cards 15. To each planar wave guide card 15 there is assigned one of the first adapters 11 and a plurality of the second adapters 12. In the preferred embodiment shown in FIGS. 1 to 3, to each planar wave guide card 15 there is assigned one MPO adapters 11 having twelve adapter ports 13 for twelve optical fibers terminated in a ribbon fiber connector and six duplex adapters 12 each having two adapter ports 14 for two optical fibers each terminated in a single fiber connector.

According to the shown embodiment, the first adapter 11 and said plurality of second adapters 12 are assigned to opposite sides of each planar wave guide card 15. However, it should be noted that it is also possible that the first adapter 11 and the plurality of second adapters 12 are assigned to the same side of each planar wave guide card 15.

In the preferred embodiment shown in FIGS. 1 to 3, the two planar wave guide cards 15 are mechanically cascaded in a way that a first planar wave guide card 15 is mounted to a supporting frame 20 (see FIGS. 2, 3) and that a second planar wave guide card 15 is mounted to the first planar wave guide card 15. The fiber optic furcation module 10 can be mounted to a housing through said supporting frame 20, whereby a plurality of such fiber optic furcation modules 10 are typically mounted to a housing.

The first adapter 11 being preferably a MPO adapter and the plurality of second adapters 12 being preferably duplex adapters which are assigned to each planar wave guide card 15 are halves of standard MPO or standard duplex adapters.

Each planar wave guide card 15 provides a plurality of fiber optic transmission channels 16 running within the respective planar wave guide card 15 and connecting each adapter port 13 of each first adapter 11 to an adapter port 14 of one of said second adapters 12 assigned to the same planar wave guide card 15 thereby providing the furcation function or break out function.

The fiber optic transmission channels 16 of the planar waveguide cards 15 provide optical traces being operative to transmit and/or receive optical wavelength signals. The planar waveguide cards 15 leverage the quickest possible route from the first adapter 11 to the second adapters 12 and allow reduction of the depth $d_{10}$ of the fiber optic furcation module 10 to 5 mm-10 mm.

The permissible bend diameters of optical fibers of an optical fiber assembly are no longer critical (up to 1.6 mm), since with the described, preferred configuration of planar waveguide card 15 small widths of optic transmission channels within the planar waveguide card 15 and tight bend diameters at the same time can be provided.

A planar waveguide card 15 is a member of the waveguide family, to which optical fibers also belong. A planar waveguide card is formed on a plate of substrate. This produces a firm and rigid parallelepiped, which can be very precisely tailored to the needs. The choice of materials, their refractive indexes and other properties are much bigger than in case of optical fibers.

The cladding and core of a planar waveguide card are grown or deposited on the substrate. High refractive index difference can be reached, which leads to an elevated numerical aperture (NA), which in turn allows for low widths of channels and tight bends at the same time.

Figure 4:
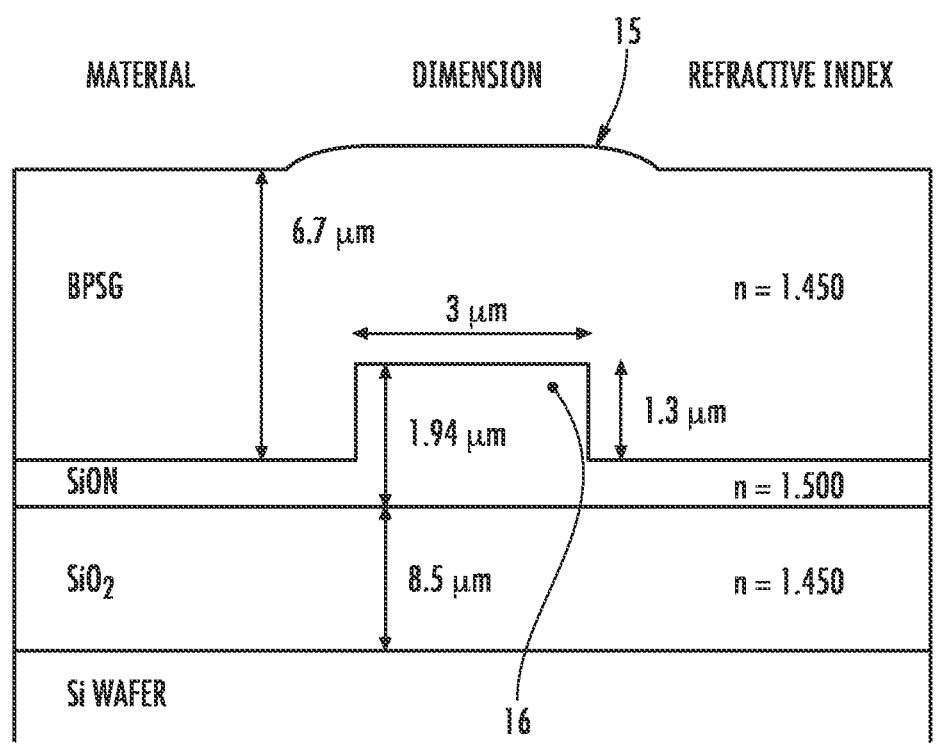
FIG. 4 shows a preferable layout of a planar waveguide card.

FIG. 4 illustrates a preferable layout of the planar waveguide card 15 used in the fiber optic furcation module 10 according to the present invention. In general, a core of the planar waveguide card 15 is buried under the Silicon Glass BPSG and is made of silicone oxynitride SiON.

The refractive index difference is 5%, which together with the thick cladding yields very good transmission capabilities. A substrate of the planar waveguide card 15 is made of pure silicon Si on which the lower cladding layer made from $SiO_2$ is grown via oxidation.

The exact dimensions that are given guarantee for the 1550 nm wavelength the desired bend diameters and transmission properties for the single mode operation of the waveguide channels 16. However, the dimensions can be amended within the scope of this invention, e.g. to adapt the device to different wavelengths to be transmitted. The distance between fiber optic transmission channels 16 is approximately 6 µm.

The materials and manufacturing of the planar waveguide card 15 can be changed. Is possible to manufacture the core of the planar waveguide card 15 using a sol-gel process, e.g. a metal alkoxide (fluid) is subject to hydrolysis and polymeration, which consequently forms a solid. This is applied to the buried core formation. Further on, it is possible to interchange the materials only by making use of gallium arsenide or indium phosphide.

It should be noted that other layouts of the planar waveguide card 15 can be used. The so-called rib waveguide layout shown in FIG. 4 is preferred, but the invention is not limited to this layout. Other layouts of the planar waveguide card 15 can be a so-called ridge waveguide layout, or a so-called embedded waveguide layout, or a so-called immersed waveguide layout, or a so-called bulge waveguide layout, or a so-called strip-loaded waveguide lay, or a so-called metal or buffered metal waveguide layout.

Figure 5:
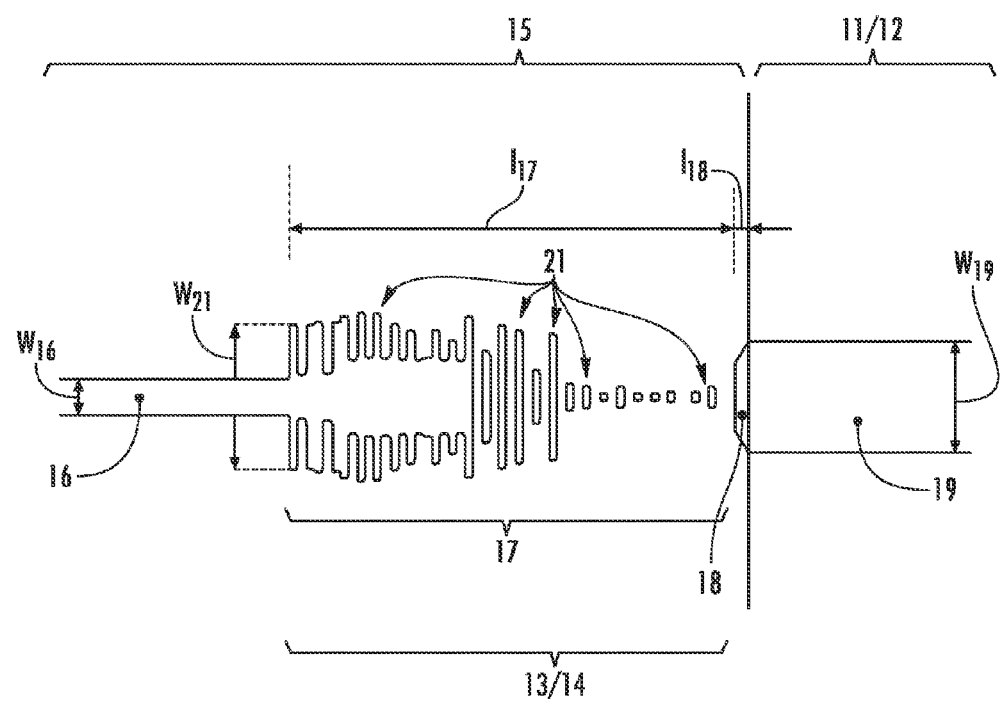
FIG. 5 shows a detail of an adapter port of the fiber optic furcation module according to the present invention including a mode conditioning element and a waveguide funnel.

Each adapter port 13, 14 provides a fiber optic interface between a fiber optic transmission channel 16 of the respective planar wave guide card 15 and an optical fiber terminated in a fiber optic connector 11, 12 and being connectable to said adapter port 13, 14 by the respective fiber optic connector 11, 12. Each adapter port 13, 14 (see FIG. 5) comprises a mode conditioning element 17 and a waveguide funnel 18 in order to provide the desired modes for a low loss coupling.

The mode conditioning element 17 of each adapter port 13, 14 provides the right size of a mode to be transmitted within the fiber optic transmission channel 16 of the respective planar wave guide card 15, as well as on the other hand the right size of the mode to be transmitted within the optical fiber core 19. The mode conditioning element 17 of each adapter port 13, 14 is positioned between a fiber optic transmission channel 16 of the respective planar wave guide card 15 running to the adapter port 13, 14 and the waveguide funnel 18 of said adapter port 13, 14.

The mode conditioning element 17 comprises waveguide stripes 21 that are deposited perpendicularly to the main transmission channel and are specially sized and separated to produce a wave broadening antenna. In such a way, the initial mode field diameter in a transmission channel is elevated which is needed to feed the wave properly into a fiber core 19. On the other hand, the mode conditioning element 17 acts as a wave thinning antenna. In such a way, the initial mode field diameter in an optical fiber core 19 is decreased in order to be fed into the transmission channel 16.

The mode conditioning element 17 provides the conversion of the size of the light mode in the following way: When light propagates from the optical fiber—it reduces the mode field diameter from around 10 μm to around 4 μm to be transmitted within a fiber optic transmission channel of the planar wave guide card.

When the light propagates from the fiber optic transmission channel of the planar wave guide—it increases the mode field diameter from around 4 μm to around 10 μm to be transmitted within the optical fiber.

The width $w_{16}$ of each fiber optic transmission channel 16 of the respective planar wave guide card 15 running to an adapter port 13, 14 is smaller than the width $w_{19}$ of a fiber core 19 of the optical fiber terminated in a fiber optic connector being connectable to said adapter port 13, 14.

The waveguide funnel 18 of each adapter port 13, 14 provides a smooth transition between the fiber optic transmission channel 16 of the respective planar wave guide card 15 running to an adapter port 13, 14 and the fiber core 19 of the optical fiber terminated in a fiber optic connector being connectable to said adapter port 13, 14.

The waveguide funnel 18 is a 3D structure, on which the fiber core's 19 circumference is almost circumscribed. The waveguide funnel 18 can be produced by an etching process.

In the preferred embodiment, each optic transmission channel 16 provided by a planar wave guide card 15 comprises a width $W_{16}$ of approximately 3 μm, wherein each fiber core 19 of each optical fiber terminated in a fiber optic connector comprises a width $w_{19}$ of approximately 8 μm, and wherein the funnel 18 comprising a length $l_{18}$ of approximately 10 μm providing a smooth transition between the fiber optic transmission channel 16 and the fiber core 19. The mode conditioning element 17 comprising the waveguide stripes 21 comprising a length $l_{17}$ of approximately 140 μm, whereby the width $w_{21}$ of the waveguide stripes 21 is varying between approximately 1 μm and approximately 18 μm and whereby the thickness of the waveguide stripes 21 is approximately 2.7 μm.

Naturally, the design of the adapter ports 13, 14 according to FIG. 4 is used on both sides of the module (multifiber and singlefiber), as the light wave can be sent via it in either direction.

What is claimed is:

1. A fiber optic furcation module, comprising
   at least one planar wave guide card;
   a first adapter assigned to the at least one planar wave guide card, the first adapter comprising a plurality of adapter ports for optical fibers terminated in an optical fiber ribbon connector;
   a plurality of second adapters assigned to the at least one planar wave guide card, each of said second adapters comprising one adapter port or two adapter ports, the one or two adapter ports being operative to receive respective single optical fiber connectors terminated with single optical fibers;
   a plurality of fiber optic transmission channels provided by the at least one planar wave guide card, the fiber optic transmission channels providing optical traces being operative to transmit and/or receive optical wavelength signals and connecting each adapter port of said first adapter with at least one of said one adapter port or said two adapter ports of one of said second adapters.

2. The fiber optic furcation module as claimed in claim 1, wherein the first adapter assigned to the at least one planar wave guide card is an MPO adapter.

3. The fiber optic furcation module as claimed in claim 1, wherein said second adapters assigned to the at least one planar wave guide card are simplex adapters each having one adapter port for one optical fiber terminated in a single fiber connector.

4. The fiber optic furcation module as claimed in claim 1, wherein said plurality of second adapters assigned to the at least one planar wave guide card are duplex adapters each having two adapter ports for two optical fibers each terminated in a single fiber connector.

5. The fiber optic furcation module as claimed in claim 4, wherein each adapter port provides a fiber optic interface between a fiber optic transmission channel of a respective one of the at least one planar wave guide card and an optical fiber terminated in a fiber optic connector and being connectable to said adapter port by the respective fiber optic connector.

6. The fiber optic furcation module as claimed in claim 5, wherein each adapter port comprises a mode conditioning element and a waveguide funnel.

7. The fiber optic furcation module as claimed in claim 6, wherein said mode conditioning element of each adapter port reduces a mode field diameter from around 10 μm to around 4 μm to be transmitted within the fiber optic transmission channel of the planar wave guide card.

8. The fiber optic furcation module as claimed in claim 6, wherein said mode conditioning element of each adapter port increases a mode field diameter from around 4 μm to around 10 μm to be transmitted within a fiber core of the optical fiber terminated in a fiber optic connector being connectable to said adapter port.

9. The fiber optic furcation module as claimed in claim 6, wherein the mode conditioning element of each adapter port is positioned between a fiber optic transmission channel of the respective one of the at least one planar wave guide card running to the adapter port and the waveguide funnel of said adapter port.

10. The fiber optic furcation module as claimed in claim 9, wherein the width of each fiber optic transmission channel of the respective one of the at least one planar wave guide card running to an adapter port is smaller than the width of a fiber core of the optical fiber terminated in a fiber optic connector being connectable to said adapter port.

11. The fiber optic furcation module as claimed in claim 10, wherein the waveguide funnel of each adapter port provides a smooth transition between the fiber optic transmission channel of a respective one of the at least one planar wave guide card running to an adapter port and the fiber core of the optical fiber terminated in a fiber optic connector being connectable to said adapter port.

12. The fiber optic furcation module as claimed in claim 11, wherein each optic transmission channel provided by the at least one planar wave guide card comprises a width of approximately 3 μm, wherein each fiber core of each optical fiber terminated in a fiber optic connector comprises a width of approximately 8 μm, and wherein the waveguide funnel comprising a length of approximately 10 μm provides a smooth transition between the fiber optic transmission channel and the fiber core.

13. The fiber optic furcation module as claimed in claim 1, wherein said first adapter and said plurality of second adapters are assigned to opposite sides of the at least one planar wave guide card.

14. The fiber optic furcation module as claimed in claim 1, wherein said first adapter and said plurality of second adapters are assigned to the same side of the at least one planar wave guide card.

15. The fiber optic furcation module as claimed in claim 1, comprising two mechanically cascaded planar wave guide cards, each comprising a first adapter, a plurality of second adapters and fiber optic transmission channels, whereby a first planar wave guide card is mounted to a supporting frame and whereby a second planar wave guide card is mounted to the first planar wave guide card.

16. The fiber optic furcation module as claimed in claim 1, wherein the first adapter assigned to each planar wave guide card is an MTP adapter.

17. A fiber optic furcation module, comprising
at least one planar wave guide card;
a first adapter assigned to the at least one planar wave guide card, the first adapter comprising a plurality of adapter ports for optical fibers terminated in an optical fiber ribbon connector;
a plurality of second adapters assigned to the at least one planar wave guide card, each of said second adapters comprising one adapter port or two adapter ports, the one or two adapter ports being operative to receive respective single optical fiber connectors terminated with single optical fibers;
a plurality of fiber optic transmission channels provided by the at least one planar wave guide card, the fiber optic transmission channels providing optical traces being operative to transmit and/or receive optical wavelength signals and connecting each adapter port of said first adapter with at least one of said one adapter port or said two adapter ports of one of said second adapters;
wherein each adapter port provides a fiber optic interface between a fiber optic transmission channel of a respective one of the at least one planar wave guide card and an optical fiber terminated in a fiber optic connector and being connectable to said adapter port by the respective fiber optic connector; and
wherein each adapter port comprises a mode conditioning element and a waveguide funnel.

18. The fiber optic furcation module as claimed in claim 17, wherein the mode conditioning element comprises waveguide stripes.

19. The fiber optic furcation module as claimed in claim 18, wherein the waveguide stripes are deposited perpendicular to the fiber optic transmission channel.

20. The fiber optic furcation module as claimed in claim 18, wherein the waveguide stripes are specially sized and separated to produce one of a wave broadening antenna and a wave thinning antenna.

* * * * *